R. EMERSON, Jr.
Sugar Mill.
No. 23,237.
Patented March 15, 1859.
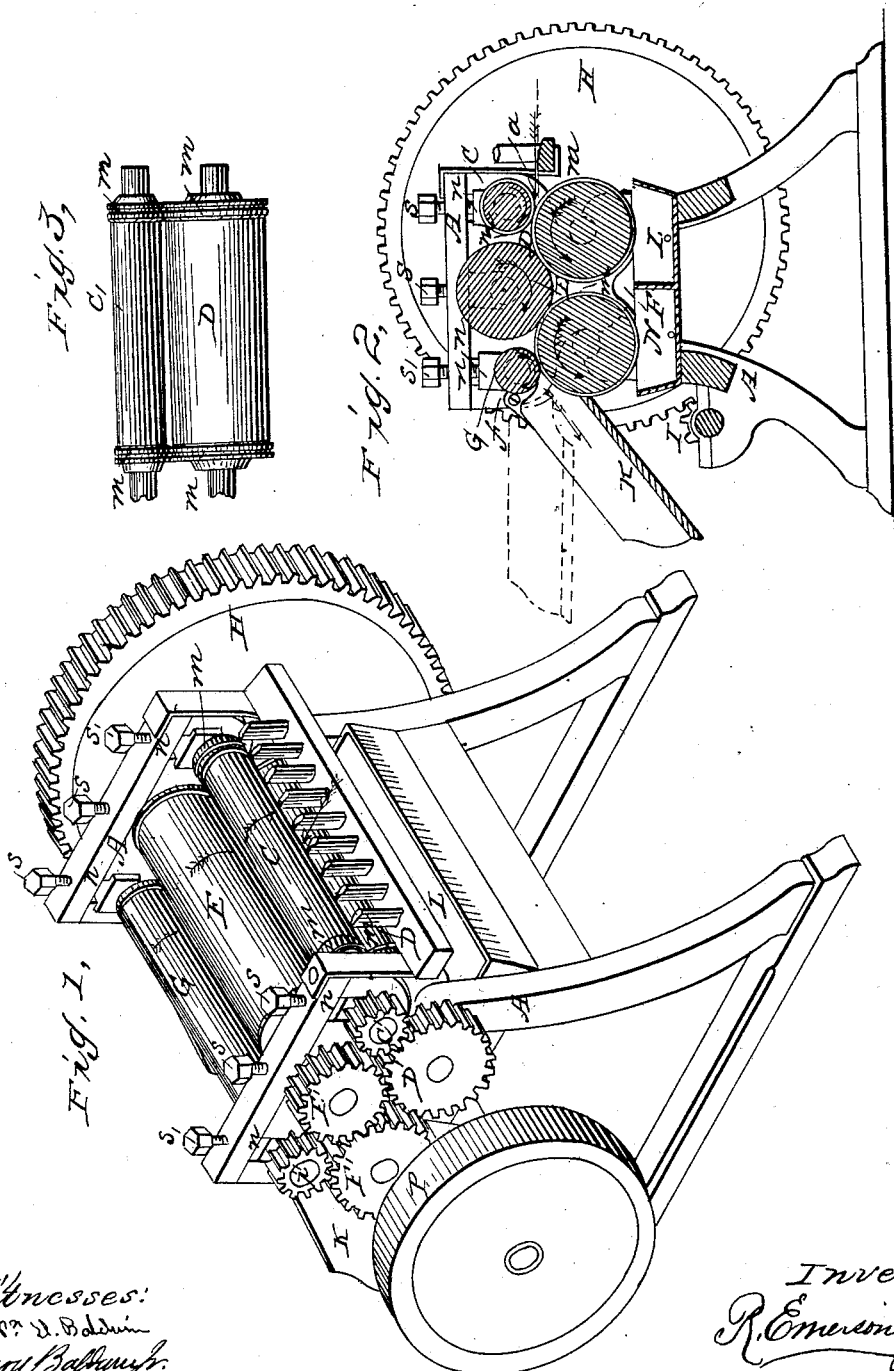

UNITED STATES PATENT OFFICE.

RALPH EMERSON, JR., OF ROCKFORD, ILLINOIS.

IMPROVEMENT IN SUGAR-MILLS.

Specification forming part of Letters Patent No. 23,237, dated March 15, 1859.

*To all whom it may concern:*

Be it known that I, RALPH EMERSON, Jr., of Rockford, in the county of Winnebago and State of Illinois, have invented certain new and useful improvements in mills for extracting the juices of plants, and particularly adapted to the extraction of the juice of the Chinese sugar-cane or sorghum; and I do hereby declare that the following is a full, clear, and exact description of the construction and operation of the same, reference being had to the annexed drawings, making part of this specification, in which—

Figure 1 represents a view in perspective, and Fig. 2 a vertical longitudinal section, of the machine; and Fig. 3 represents a side view of the first pair of rollers detached, giving a further illustration of the device of the fillets, to be hereinafter described.

It has been found from experiments on the Chinese sugar-cane that the juice of best quality is contained in the pith beneath the outside rind. It is also found that the juice of the pith requires a less severe pressure to extract it than that of the rind, and that after the rind is cracked a moderate pressure expels the best part of the juice, while the inferior juice remains in the stalk until forced out by a more intense pressure. In my improved mill advantage is taken of this circumstance to separate the better portion of the juice and collect it apart from the other by means of a combination of rollers, C D E F G, between which the cane, as it passes through, (entering at $a$ and issuing at $z$,) receives several successive pressures (first lighter and afterward more intense) at 1, 2, 3, and 4, and the pan to receive the expressed juices is divided into two separate receptacles, L and N, the former located beneath the roller D to receive the product of the lighter pressure, and the latter beneath the roller F to receive the product of the last and heaviest pressure. The juices may be drawn off from these receptacles by any suitable means. The first pressure at 1, between the rollers C and D, is intended merely to break the outer rind of the cane. Instead of doing this by pressure, I have also used an apparatus for slitting the cane to open it; but I do not claim the slitting apparatus as a part of this invention. The interval between the rollers E and D at 2 is smaller than that between C and D at 1, and the cane at 2 receives sufficient pressure to expel all but the inferior juice, and the product of this pressure flows over the roller D and drops into the receptacle L. The intervals at 3 and 4 between the roller F and the two rollers E and G are less than the interval at 2, and are small enough to give the heavy final pressure required to expel the last portions of the juice. The intervals 3 and 4 are equal, or nearly so, the purpose being a more complete extraction of the juice by a repetition of the heavy pressure rather than by its further increase. The inferior juice produced by these heavy pressures flows down over the roller F into the second receptacle, N. These successive actions upon the cane are clearly shown in Fig. 2, the rollers revolving in the direction indicated by the arrows. The lower rollers, D and F, are supported by their journals in fixed bearings in a strong frame, A A, and the upper rollers, C, E, and G, are supported in like manner in sliding journal-boxes $n$ $n$ $n$, held down in the positions required by adjusting-screws $s$ $s$ $s$.

In order to secure the proper regulation of the several intervals between the rollers, some of them are provided with gage-fillets at their ends, rising above their general surface. The rollers E and G are left plain, while the others have fillets $m$ $m$ $m$ at the ends, as shown in the drawings. The fillet of the roller D fixes the narrowest limit of the interval 2 between that roller and E. The fillet of C, running on the fillet of D, fixes the narrowest limit of the interval 1 wider than that of the interval 2 by the thickness of the fillet of C, while the fillet of F fixes the common narrowest limit of the intervals 3 and 4. The fillet of F is therefore considerably less than that of D. The fillets must be made of a thickness adapted to the expression of the juice from the smallest stalks it is proposed to pass through the rolls; but as the growth of cane varies so widely in different localities a uniform rule for the thickness of the fillets cannot be given, but must be left to the judgment of constructors of mills for the several localities in which they are to be used, care being taken in all cases to avoid making the fillets so thin as to endanger the breaking of the rolls in case they should be accidentally set too close, while on the other hand the fillets must not be made so thick as to prevent the cane from being fully pressed. By means of this arrangement the working of the mill may be entrusted to unskillful persons without danger on the one hand of losing that due graduation of the pressures on which depends the proper separation of the good and the inferior juices, or, on the other hand, of the rollers being brought so near together as to be broken by excess of pressure. The several rollers are geared together at one end by toothed wheels C' D' E' F' G', and at the other end the roller D has a large cog-wheel, H, secured to its axis, and into this a pinion, I, is geared. To the shaft of the pinion the driving-power is applied by means of a pulley, P. The crushed cane on issuing from the rollers passes over an inclined tail-board, K. This tail-board is hinged at $f$, and can be turned up into the position shown in dotted lines in Fig. 2, so as to afford access to the pan in which the juices are collected.

What I claim as my invention is—

1. The combination of parts in the machine in such manner as to subject the cane first to a lighter pressure and afterward to a heavier pressure, and to deliver the respective juices expressed by said lighter and heavier pressures into separate receptacles, for the purpose specified.

2. The combination of the gage-fillets with the pressure-rolls, whereby any unskilled operator is enabled to adjust and work the machine, substantially as herein set forth.

In testimony whereof I have hereunto subscribed my name.

RALPH EMERSON, JR.

Witnesses:
WM. D. BALDWIN,
HENRY BALDWIN, Jr.